| United States Patent [19] | [11] Patent Number: 4,883,925 |
| Graf | [45] Date of Patent: Nov. 28, 1989 |

[54] SEALED SOLDER CONNECTOR ASSEMBLY AND METHOD OF USE

[76] Inventor: Albert C. Graf, 332 Bunker Hill Dr., Pensacola, Fla. 32507

[21] Appl. No.: 189,142

[22] Filed: May 2, 1988

[51] Int. Cl.$^4$ ............................................. H02G 15/18
[52] U.S. Cl. ..................................... 174/84 R; 29/859; 29/871; 174/DIG. 8; 285/381; 403/273
[58] Field of Search ....................... 174/84 R, DIG. 8; 403/271, 272, 273, 286; 285/381; 439/932; 29/859, 869, 871

[56] References Cited

U.S. PATENT DOCUMENTS

| 3,316,343 | 4/1967 | Sherlock | 403/273 X |
| 3,396,460 | 8/1968 | Wetmore | 174/84 R |
| 3,582,457 | 6/1971 | Barthell | 174/DIG. 8 X |
| 3,957,382 | 5/1976 | Grevel, Jr. et al. | 174/DIG. 8 X |
| 4,151,364 | 4/1979 | Ellis | 174/DIG. 8 X |
| 4,504,699 | 3/1985 | Dones et al. | 174/84 R |
| 4,586,971 | 5/1986 | Wallace, Jr. | 174/DIG. 8 X |
| 4,595,724 | 6/1986 | Koblitz | 174/84 R X |
| 4,696,841 | 9/1987 | Vidakovits | 174/84 R X |

*Primary Examiner*—Morris H. Nimmo
*Attorney, Agent, or Firm*—Phillip A. Rein

[57] ABSTRACT

This invention relates to a sealed solder connector assembly and method of use operable to interconnect adjacent conduit wire members having exposed wire sections extended from insulated cover sections. The sealed solder connector assembly includes (1) a main support member constructed of a flexible plastic tubing; (2) a wire anchor member constructed of a low temperature melting point solder material placed interiorly and centrally of the main support member; and (3) an interior anchor coat of a temperature controlled adhesive film anchored to an interior surface of the main support member. Application of heat to the main support member results in (1) initial securing of the wire anchor assembly centrally of the main support member; (2) anchoring and sealing the main support member about the conduit wire members; and (3) melting and fusing the wire anchor member to the wire sections of the wire members. The method of this invention involves the initial steps of adjoining wire members in an abutting condition having the sealed wire connector assembly of this invention mounted thereabout; applying a controlled heat supply to provide shrinkage of the main support tube member; melting of the wire anchor member; and securing with the interior anchor coat to achieve the new, novel sealed solder connection of this invention.

5 Claims, 1 Drawing Sheet

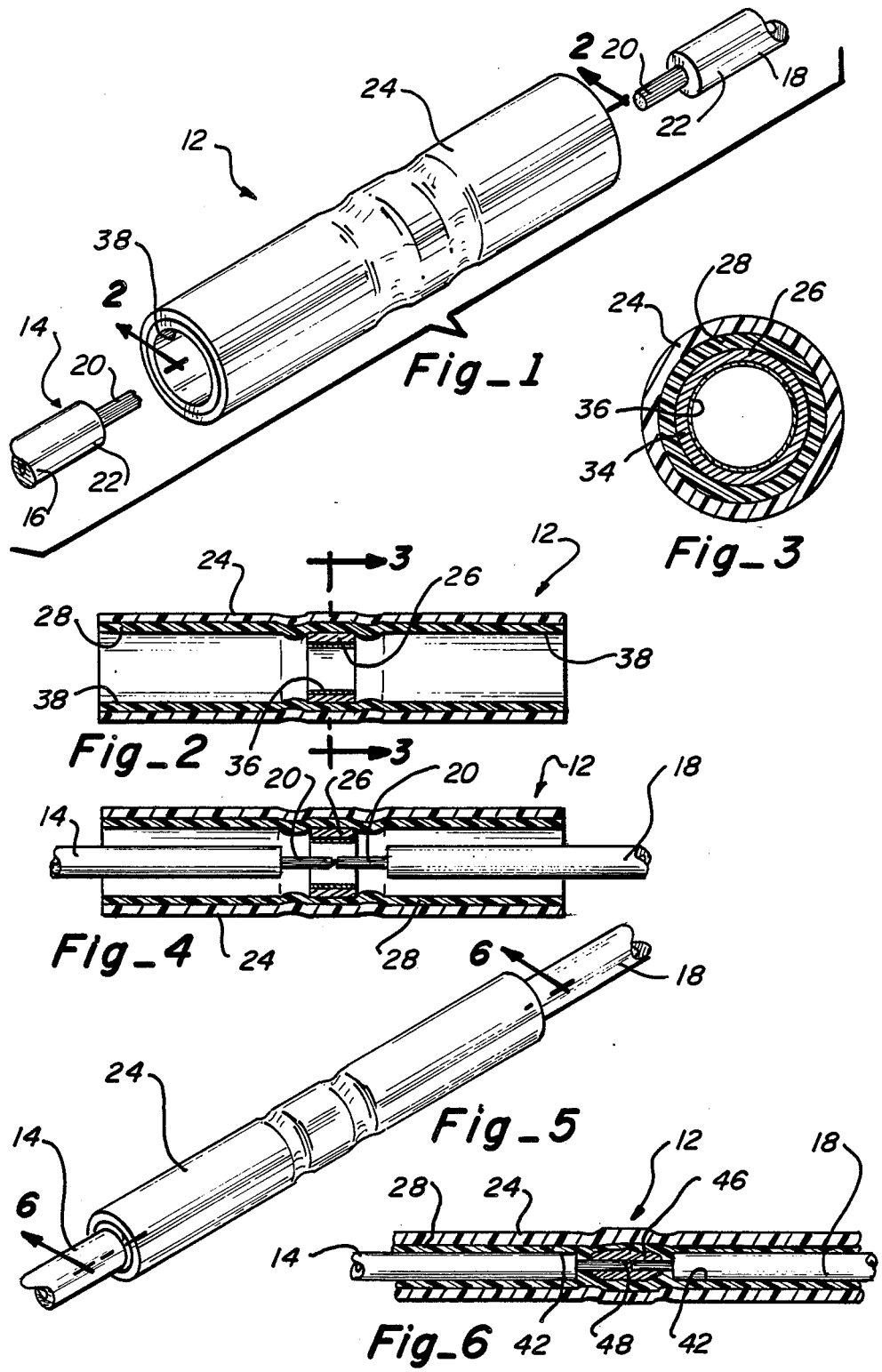

SEALED SOLDER CONNECTOR ASSEMBLY AND METHOD OF USE

PRIOR ART

A patent search was not conducted on subject invention but the applicant, being knowledgeable in the connector art, believes the sealed solder connector assembly to be a new and novel combination of elements.

PREFERRED EMBODIMENT OF THE INVENTION

In one preferred embodiment of this invention, a sealed solder connector assembly is operable to be utilized with an electrical conductor which consists of abutting a pair of wire members to be joined, each having central wire sections and outer cover sections. It is the normal practice to join a new or severed electrical conductor by the use of wire connectors or twisting of exposed wire section together for a solder operation which then requires covering and sealing the connection with electrical tape or the like. The sealed solder connector assembly includes (1) a main support member being a plastic tube; (2) a wire anchor member positioned centrally of the main support member; and (3) an interior anchor coat on an inner surface of the main support member. The main support member is constructed of a heat shrinkable tubing that will shrink on the application of controlled heat on the outer surface and which may be color coded for identification purposes. The internal diameter of the main support tube is selected so as to be compatible with the AWG size of the electrical wire members to be joined and sealed therewith. The wire anchor member is of a ring shape having predetermined inner and outer diameters to (1) set within the main support tube; and (2) receive the wire sections of the wire members centrally thereof. The wire anchor member is constructed of a solder material having a low melting point whereby the solder melts on application of heat while concurrently the main support tube shrinks about the wire members. The interior anchor coat is constructed of an adhesive film which is applied to the entire length and internal diameter of the main support member. The adhesive film is solid at room temperature but becomes fluid and adhesive on the application of heat. In the heated fluid state, the adhesive film adheres to the outer cover sections on the wire members to achieve, in combination with the concurrent shrinkage of the main support tube, an airtight connection to prevent entry of vapor, moisture, and resultant corrosion in the area of the solder connection and the joined wire sections of the created electrical conductor.

OBJECTS OF THE INVENTION

One object of this invention is to provide a sealed solder connector assembly operable to join adjacent ends of electrical wire members achieving an electrical conductor in an efficient sealed manner which prevents corrosion of the subject connection due to a sealed structure about the wire members.

One other object of this invention is to provide a sealed solder connector assembly including a main support member having a wire anchor member positioned centrally and internally thereof and, on placing abutting electrical wire sections to be connected centrally therein with the application of external heat, the wire anchor member solders the adjacent wire sections while the main support member shrinks to provide a sealed enclosure about and on both sides of the solder joint connection.

One further object of this invention is to provide a sealed solder connector assembly including a tubular main support member having a solder type wire anchor member positioned internally and centrally thereof and an internal surface of the main support tube member coated with an anchor coat of adhesive material whereby on the application of heat to the main support member (1) the wire anchor member melts to form a solder joint with adjoining wire sections; (2) the adhesive anchor coat becomes fluid and adhesive to secure the main support member to cover members about the wire sections; and (3) the main support member shrinks about the cover members to achieve an airtight weather sealed electrical connection.

Still, one further object of this invention is to provide a sealed solder connector assembly which can be constructed of various diameters and lengths; color coded to indicate size; economical to manufacture; and easy to use.

Another object of this invention is to provide a method of joining adjacent wire members with a sealed solder connector assembly in a minimum amount of steps and effort to achieve a sealed, corrosion-free electrical connection.

Various other objects, advantages and features of the invention will become apparent to those skilled in the art from the following discussion, taken in conjunction with the accompanying drawings, in which:

FIG. 1 is a perspective view of a sealed solder connector assembly of this invention illustrated with spaced electrical wire members positioned adjacent opposed open ends thereof;

FIG. 2 is a cross-sectional view of the sealed solder connector assembly taken along line 2—2 in FIG. 1;

FIG. 3 is an enlarged sectional view taken along line 3—3 in FIG. 2;

FIG. 4 is a sectional view similar to FIG. 2 illustrating the electrical wire members in abutting condition prior to a method step of interconnecting same;

FIG. 5 is a perspective view similar to FIG. 1 illustrating the sealed solder connector assembly in the sealed connected condition about the adjacent electrical wire members; and FIG. 6 is a sectional view taken along lines 6—6 in FIG. 5 showing the sealed connection of the adjacent electrical wire members by the sealed solder connector assembly of this invention.

The following is a discussion and description of a preferred specific embodiment of the new sealed solder connector assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a sealed solder connector assembly of this invention, indicated generally at 12, is shown as having electrical wire members 16,18 adjacent opposite open ends thereof. The wire members 16, 18 can be joined together to form an electrical conductor 14. The electrical wire members 16, 18 each consists of an electrical conduit wire section 20 enclosed by an insulation cover section 22. The wire members 16, 18 are normally joined together by a wire connector or twisting together of the wire portions 20, soldering same, and then covering with an electrical insulated tape. However, these prior art methods of electrical connection do not achieve a weatherproof sealed connection and, therefore, corrosion occurs due to (1) a lower efficiency of the electrical connection of the wire members 16, 18; or (2) eventually results in an electrical arc and failure of the electrical connection.

It is known in the prior art to use a plastic tubing connector with metal portions and a specially designed crimping tool for interconnection of the wire members 16, 18 but such resultant electrical connector does not achieve the weatherproof sealed and solid connection achieved by the sealed solder connector assembly 12 of this invention described hereinafter.

The sealed solder connector assembly 12 includes (1) a main support member 24; (2) a wire anchor member 26 positioned within the main support member 24; and (3) an interior anchor coat 28 on the internal surfaces of the main support member 24.

The main support member 24 consists of a flexible plastic tube member 22 which is a heat-shrinkable product manufactured by ECC-3M, a division of 3M, and marketed under the trademark "Insultite". More particularly, the main support member or tube member 24 is constructed of a multiple wall polyolefin material having the following characteristics:

(1) shrinks on the application of heat with at minimum of 275 degrees Fahrenheit temperature;

(2) acceptable operating temperature range is minus 67 degrees Fahrenheit to 230 degrees Fahrenheit.

(3) has a shrink ratio of 2.5:1; and (4) non-corrosive, highly resistant to moisture absorbtion and non-electrical conductive.

The main support member 24 of the embodiment discussed herein, has the following relative dimensions and used with wire members 16,18 in a wire size range of 14–16 AWG.

Overall length—1.625 inch
Interior diameter—0.250 inch
Tubular wall thickness—0.030 inch It is noted that the plastic tube member 24 can be constructed of clear or various colored materials such as red, blue, and yellow which indicates use on different wire sizes such as red for 22–16 AWG wire gauge; blue for 14–16 AWG wire gauge; and yellow for 12–10 AWG wire gauge.

The wire anchor member 26 consists of a cylindrical ring member 34 constructed of a low temperature melting solder material and having a flux coat 36 on an inner surface thereof. It has been found that the preferred solder material is constructed of a composition of 50% tin; 32% lead; and 18% cadmium which has a melting temperature of 291 degrees Fahrenheit.

The flux coating 36 is preferrably a mildly activated rosin material being a 2.0 or 3.0% coating applied to the outer surface of the ring member 34. The flux or outer rosin material operates in a conventional manner to remove oxidizes that might be present on the wire sections 20 of the wire members 16, 18 so that a solid solder connection will be obtained on applying relatively low temperature heat to the wire anchor member 26.

The interior anchor coat 28 consists of an adhesive film 38 which is fabricated initially with the plastic tube member 24. The adhesive film 38 is constructed of an ethylene-ethyl-acrylate material known as EEA a characteristic of being in a solid state at room temperatures. However, on heating the main support member 24 in a manner to be explained, the adhesive film 38 is transformed into a fluid adhesive material which bonds to the adjacent portion of the main support member 24, the wire anchor member 26, and additionally, to the cover sections 22 on the conduit wire members 16, 18. The adhesive film 38 becomes fluid and adhesive at temperatures below the 291 degree Fahrenheit temperature which is applied to the outer surface of the main support member 24 to achieve shrinkage thereof as will be noted.

The wire anchor member 26 for the main support member 24 as described is preferrably constructed as follows:

Length—0.200+/—0.010 inch
Inside diameter—0.195 to 0.200 inch
Outside diameter—0.220 to 0.225 inch Therefore, it is noted that the wall thickness of the ring member 34 is of median dimension of 0.025 inch thickness.

On assembly of the sealed solder connector assembly 12, the main support tube member 24 is initially manufactured having the interior anchor coat 28 applied thereto. The next step is to place the wire anchor member 26 having the flux coat 36 thereon in a central position of the tube member 24. Then, a heat supply means such as a torch or electrical tube heater applies a localized amount of controlled heat to the central outer portion of the main support member 24. This causes a controlled shrinkage of the tube member 24 about the adjacent exterior portion of the ring member 34 which causes an adhesive bonding between subject central portion and the outer surface of the ring member 34. This operates to assure that the wire anchor member 26 is held in its desired central position during shipping and other transporting procedures prior to utilizing the sealed solder connector assembly 12 to anchor the adjacent ends of the wire members 16, 18.

USE AND OPERATION OF THE INVENTION

In the use and operation of the invention, it is noted that the sealed solder connector assembly 12 is supplied to the end user thereof in the condition as shown in FIG. 2 having the wire anchor member 26 secured in a central position of the tube member 24 and the interior surface of the tube member 24 is coated with the interior anchor coat 28.

The user of the sealed solder connector assembly 12 moves the conduit wire members 16, 18 into the abutting condition as noted in FIG. 4 with the wire portions 20 in the center of the wire anchor member 26. Next, a heat supply is provided to the exterior surface of the main support member 24 along the entire length to cause a controlled heating. The application of heat to the main support member 24 achieves a shrinking about the adjacent ends of the cover sections 22 of the conduit wire members 16, 18. Concurrently, the wire anchor member 26, on reaching a temperature of 291 degrees Fahrenheit, achieves a melting of the ring member 34 about the exposed wire sections 20 and the interior anchor coat 28 is in an adhesive liquid and free-flowing condition.

In conjunction with the shrinking of the outer main support member 24, the adhesive film 38 provides an adhesive bonding which occurs against and about the exterior surface of the cover sections 22 of the conduit wire members 16,18 and the ring member 34.

More specifically, as noted in FIG. 6, a sealed surface 42 is obtained by the interior anchor coat 28 between the interior diameter of the main support member 24 and the exterior support surface of the adjacent cover sections 22 of the wire members 16, 18. Additionally, a fused area 46 is formed with the wire sections 20 and the wire anchor member 26 due to the melting at the 291 degrees Fahrenheit temperature. During this operation, it is obvious that the ends of the wire sections 20 are maintained in an abutting condition and the solder of the ring member 34 will flow into wire strands of the wire sections 20 to achieve a solid integral electrical connection.

After the controlled application of heat is removed, cooling of the main support member 24 maintains the sealed tight connection as noted in FIG. 6 about the cover sections 22 of the conduit wire members 16, 18. Additionally, on the removal of the heat supply, the adhesive film 38 then assumes a sealed, dried adhesive condition which prevents any outside moisture, vapors, or corrosive elements from gaining access to the fused area 46 and the wire sections 20. A solder-copper wire fused area 48 is formed to provide a solid anchor section to prevent lateral movement of the conduit wire members 16, 18 to achieve a rigid electrical conductor 14.

It is seen that the sealed solder connector assembly of this invention is a unique combination of elements for achieving the new and novel function and end result of this invention which is economical to manufacture, simple in construction, easy to use, and achieves a strong, airtight sealed connection of adjacent portions of electrical wire members.

In the method of using the sealed solder connector assembly 12 of this invention, the new and novel steps include:

(1) supplying a sealed solder connector assembly 12 of this invention;

(2) supplying a severed electrical conductor 14 including wire members 16, 18 each with a wire section 20 and adjacent cover section 22;

(3) placing the wire sections 20 and cover sections 22 centrally and interiorly of the sealed solder connector assembly 12 in adjacent relationship;

(4) applying a source of heat supply to the main support member 24 at a minimum temperature of 291 degrees Fahrenheit;

(5) applying subject heat for a predetermined time period to achieve melting of a wire anchor member 26, shrinkage of the main support member 24 about the cover sections 22, and heating of the interior anchor coat 28 to achieve fluid adhesive condition; and (6) removing of the heat supply to allow final shrinkage of the main support member 24 and setting up of the interior anchor coat 28 and the wire anchor member 26 to achieve a sealed, solid electrical conductor 14.

The method steps of this invention involve the sealed solder connector assembly 12 to obtain a soldered, spliced, and completely sealed connection of the electrical wire members 16, 18 with a minimum amount of effort and not requiring skilled labor.

While the invention has been described in conjunction with preferred specific embodiments thereof, it will be understood this description is intended to illustrate and not to limit the scope of the invention, which is defined by the following claims.

I claim:

1. A sealed solder connector assembly used to permanently join and enclose adjacent ends of severed members, comprising:

(a) a main support member of tubular shape;

(b) a cylindrical anchor member secured within said main support member;

(c) said main support member constructed of a heat-shrinkable material;

(d) said anchor member constructed of low temperature heat melt material;

(e) said melt material includes a low temperature melt solder material having an inner flux coating thereon; and (f) said solder material composed of 50 percent tin, 32 percent lead, and 18 percent cadmium;

whereby, the subsequent application of heat about an exterior surface of said main support member causes said main support member to shrink into a skin and airtight fit over said severed members to be enclosed thereby and said anchor member melts and fuses with said severed members.

2. A sealed solder connector assembly used to permanently join and enclose adjacent ends of severed electrical conductor wire members each having a central wire section exposed from an insulation cover member, comprising:

(a) a main support member constructed of heat-shrinkable tubing material of a size to receive conductor wire members therein and enclose exposed portions of wire sections and a portion of an insulation cover member; and (b) a wire anchor member constructed of a low temperature melt material positioned inside said main support member and of a size to receive exposed portions of wire sections to be joined;

(c) said melt material constructed of a solder material having an inner flux coating thereon; and (d) said melt material constructed of a material composed of 50 percent tin; 32 percent lead; and 18 percent cadmium.

whereby the subsequent application of heat about an exterior of said main support member with said adjacent ends of said wire sections shrinks said main support member about said wire anchor member and said conductor wire members to achieve an airtight electrical connection.

3. A sealed solder connector assembly used to permanently join and enclose adjacent ends of severed members, comprising:

(a) a main support member of tubular shape;

(b) a cylindrical ring anchor member secured within said main support member positioned centrally thereof;

(c) said main support member constructed of a heat-shrinkable material;

(d) said anchor member constructed of low temperature heat melt material;

(e) an interior anchor coat secured to an inside diameter of said main support member in contact with an outer surface of said anchor member to hold in position;

whereby the subsequent application of heat about an exterior surface of said main support member with the adjacent ends of the severed members mounted therein causes said main support member to shrink into a skin and airtight fit over the severed members enclosed thereby, said anchor member melts and fuses with the severed members and said anchor coat melts and secures said main support member to the severed members to form an airtight seal.

4. A sealed solder connector assembly used to permanently join and enclose adjacent ends of severed electrical conductor wire members each having a central wire section exposed from an insulation cover member, comprising:
  (a) a main support member constructed of heat-shrinkable tubing material of a size to receive said conductor wire members therein and enclose exposed portions of said wire sections to be joined and a portion of said insulation cover members;
  (b) a wire anchor member of ring shape constructed of a low temperature melt material positioned inside said main support member and of a size to receive and enclose exposed portions of said wire sections to be joined; and
  (c) an interior anchor coat secured to an inside diameter and entire length of said main support member being an adhesive type material to anchor said wire anchor member to said main support member and secure said main support member to said cover members of said wire sections to be joined on application of heat thereto.
  whereby the subsequent application of heat about an exterior of said main support member with said adjacent ends of said wire sections to be joined shrinks said main support member about said wire anchor member and said conductor wire members to achieve an airtight electrical connection; and said anchor member fuses said wire sections to be joined together.

5. A method of joining adjacent ends of electrical wire members, each having a central wire section enclosed by an insulation cover member, through the use of a sealed solder connector assembly having a main support member with a wire anchor member mounted therein, the process steps, comprising:
  (a) exposing ends of wire sections from respective ones of cover members;
  (b) coating an inside surface and entire length of said main support member with an adhesive material being solid at room temperature and a liquid adhesive form at elevated temperatures;
  (c) inserting respective ones of said wire sections from opposite ends into adjacent abutting positions in a main support member and a wire anchor member enclosed therein;
  (d) applying initial external heat to said main support member causing same to shrink about said wire anchor member and said adhesive material to secure said main support member to said wire members and said wire anchor member to said exposed ends of said wire sections; and
  (e) applying additional heat to said main support member to melt said wire anchor member about said exposed ends of said wire sections and further shrink said main support member about said wire members to form a sealed, vapor tight connection.

* * * * *